United States Patent [19]

Hergenrother et al.

[11] Patent Number: 5,659,056
[45] Date of Patent: Aug. 19, 1997

[54] STABILIZATION OF SILOXANE TERMINATED POLYMERS

[75] Inventors: William L. Hergenrother, Akron; David M. Roggeman, North Royalton; Daniel F. Graves, Clinton; Mark L. Stayer, Jr., Suffield, all of Ohio

[73] Assignee: Bridgestone Corporation, Tokyo, Japan

[21] Appl. No.: 630,298

[22] Filed: Apr. 10, 1996

[51] Int. Cl.$^6$ .................................................. C07F 7/08
[52] U.S. Cl. .................. 556/401; 556/466; 526/82; 526/340; 528/10; 528/14; 528/21
[58] Field of Search .................... 556/401, 466, 556/82, 340; 528/10, 14, 21

[56] References Cited

U.S. PATENT DOCUMENTS 4,701,490 10/1987 Burkhardt et al. ................ 556/401 X
5,274,154 12/1993 Roth et al. ........................ 556/401
5,481,014 1/1996 Graiver et al. ..................... 556/401

*Primary Examiner*—Paul F. Shaver
*Attorney, Agent, or Firm*—Frank J. Troy, Sr.

[57] ABSTRACT

The present invention relates to a method of reducing hydrolysis and coupling of substituents of siloxane end capped polymers containing hydrolyzable substituents during contact with water. The Mooney viscosity of siloxane terminated polymers is stabilized during such contact by treating the polymer with a stabilizing amount of stabilizing agent selected from the group consisting of: an acid, an acyl halide, methane sulfonic acid, toluene sulfonic acid, sulfuryl chloride, thionylchloride, phosgene, carbon dioxide, sulfur dioxide, sulfur trioxide, $SOCl_2$ and $SO_2Cl_2$, prior to contacting the siloxane terminated polymer with water.

8 Claims, No Drawings

STABILIZATION OF SILOXANE TERMINATED POLYMERS

FIELD OF THE INVENTION

Invention relates to a method of controlling the Mooney viscosity of siloxane terminated polymers during desolventization by treating the polymer cement prior to desolventization with an acid or an acyl halide.

BACKGROUND OF THE INVENTION

Elastomeric polymers such as styrene-butadiene rubbers typically containing 20 to 35% of styrene content are produced in organic solvents such as hexane. These polymers can be terminated with silane containing compounds to yield siloxane end capped polymers. This siloxane termination may also result in an increase in the Mooney viscosity of the treated polymer similar to the increase that occurs during tin coupling. However, upon subsequent desolventization of the siloxane terminated polymer through the use of either steam or heated water, an even larger increase in Mooney viscosity often occurs during the hydrolysis of siloxane groups such as pendant —OR groups on the siloxane end groups thereby leading to coupling via the formation of Si—O—Si bonds between two siloxane end groups.

Thus a process utilizing steam or heated water in the desolventization of siloxane end capped polymers containing hydrolyzable groups such as pendant —OR groups is always accompanied by an increase in the Mooney viscosity of the polymers due to the hydrolysis and subsequent coupling that occurs between the terminal siloxane groups. During this hydrolysis and coupling an undesirable alcohol by-product is also produced. This alcohol by-product can interfere with hexane recycling that must occur in commercial polymerization processes.

It would be extremely desirable to stabilize siloxane terminated polymers to prevent coupling and alcohol formation during desolventization. It is also desirable to retain —OR groups on siloxane terminated polymers during desolventization for subsequent reaction with fillers such as precipitated silica or alumina.

SUMMARY OF THE INVENTION

The present invention relates to a method of reducing hydrolysis and coupling of substituents of siloxane end capped polymers containing hydrolyzable substituents during contact with water including desolventization processes utilizing steam or heated water. The Mooney viscosity of siloxane terminated polymers is stabilized during such desolventization by treating the polymer cement prior to desolventization with a stabilizing amount of an acid or an acyl halide.

DETAILED DESCRIPTION OF THE INVENTION

Siloxane terminated polymers are well known in the art and have been prepared in U.S. Pat. No. 3,244,664, to Zelinski et al, and U.S. Pat. No. 4,185,042, to Verkouw, which are herein incorporated by reference. The process of the present invention is applicable to any elastomer having a siloxane end group having a hydrolyzable substituent which when hydrolyzed is subject to cross linking with other hydrolyzed groups. An exemplary hydrolyzable group is a pendant —OR group wherein R is an alkyl, cycloalkyl, or aromatic group optionally substituted with halo, alkyl, cycloalkyl, or aromatic groups or other groups that are non-reactive with carboxylic acids or salts thereof.

The polymers end capped with siloxane terminal groups that can be stabilized in accordance with the process of the present invention can be any elastomer known in the art including polybutadiene, polyisoprene and the like, and copolymers thereof with monovinyl aromatics such as styrene, alpha methyl styrene and the like, or trienes such as myrcene. Thus, the elastomers include diene homopolymers and copolymers thereof with monovinyl aromatic polymers. Exemplary diene homopolymers are those prepared from diolefin monomers having from 4 to about 12 carbon atoms. Exemplary vinyl aromatic polymers are those prepared from monomers having from 8 to about 20 carbon atoms. Preferred elastomers include diene homopolymers such as polybutadiene and polyisoprene and copolymers such as styrene butadiene rubber (SBR). Polymers and copolymers can comprise from about 100 to 20 percent by weight of diene units and from about 0 to 80 percent by weight of monovinyl aromatic hydrocarbon or triene units, totaling 100 percent. The copolymers are either random copolymers or block copolymers as is known in the art. Such block copolymers which include poly(styrene-butadiene-styrene) are thermoplastic elastomers. The elastomers utilized and treated in accordance with the process of the present invention display utility in an number of applications including use in the manufacture of tires.

Polymerization of the elastomers is preferably conducted in the presence of an organolithium anionic initiator catalyst composition. The organolithium initiator employed may be any of the anionic organolithium initiators known in the art to be useful in the polymerization of 1,3-diene monomers. In general, the organolithium compounds are hydrocarbyl lithium compounds of the formula $R(Li)_x$ wherein R represents hydrocarbyl groups containing from one to about 20 carbon atoms, and preferably from about 2 to 8 carbon atoms and x is an integer from 1 to 2. Although the hydrocarbyl group preferably is an aliphatic group, the hydrocarbyl groups may also be cycloaliphatic or aromatic. The aliphatic groups may be primary, secondary or tertiary although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl and octa-decyl. The aliphatic groups may contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, methylcyclopentylethyl. Examples of aromatic hydrocarbyl groups include phenyl, tolyl, phenyl ethyl, benzyl, naphthyl, phenyl cyclohexyl, and the like.

Specific examples of organolithium compounds which are useful as anionic initiators in the polymerization of conjugated dienes in accordance with the process of this invention include the following: n-butyl lithium, n-propyl lithium, isobutyl lithium, tertiary butyl lithium, amyl-lithium, and cyclohexyl lithium. Mixtures of different lithium initiator compounds also can be employed preferably containing one or more lithium compounds such as $R(Li)_x$. Other lithium catalysts which can be employed alone or in combination with the hydrocarbyl lithium initiators are tributyl tin lithium, lithium dialkyl amines, lithium dialkyl phosphines, lithium alkyl aryl phosphines and lithium diaryl phosphines. The preferred organolithium initiator is n-butyl lithium and "in situ" produced lithium hexamethylenimide initiator prepared by reacting hexamethyleneimine and n-BuLi.

The amount of initiator required to effect the desired polymerization can be varied over a wide range depending upon a number of factors such as the desired polymer molecular weight, the desired 1,2- and 1,4-content of the polydiene, and the desired physical properties for the polymer produced. In general, the amount of initiator utilized may vary from as little as 0.20 millimole of lithium per 100 grams of monomers up to about 100 millimoles of lithium per 100 grams of monomers depending upon the desired polymer molecular weight.

The polymerizations of this invention are conducted in an inert solvent and are consequently solution polymerizations. The term "inert solvent" means that the solvent does not enter into the structure of the resulting polymer, does not adversely affect the properties of the resulting polymer and does not adversely affect the activity of the catalyst employed. Suitable inert solvents include hydrocarbon solvents which may be employed include aliphatic, aromatic or cycloaliphatic hydrocarbons such as hexane, pentane, toluene, benzene, cyclohexane and the like; ethers such as tetrahydrofuran and tertiary amines such as triethylamine and tributylamine. The ether and tertiary amine solvents modify the polymerization as to styrene distribution, vinyl content and rate of reaction. The preferred solvents are aliphatic hydrocarbons and of these solvents, hexane is particularly preferred.

Polymerization conditions such as temperature, pressure and time are those known in the art for polymerizing the polymerizable monomers as described with the anionic initiator as described. For example, for illustrative purposes only, the temperatures employed in the polymerization are generally not critical and may range from about −60° C. to about 150° C. Preferred polymerization temperatures may range from about 25° C. to about 130° C. for a polymerization time of a few minutes to up to 24 hours or more, and employing pressures generally sufficient to maintain polymerization admixtures substantially in the liquid phase, preferably at or near atmospheric pressure, depending on the temperature and other reaction parameters. Polymerization of any of the above-identified monomers in the presence of an organolithium initiator results in the formation of a "living polymer". The lithium proceeds to move down the growing chain as polymerization continues. The "living polymer" from the foregoing monomers, has the following general formula:

Polymer–Li wherein the polymer is any of the foregoing elastomers, diene homopolymers, diene/monovinyl aromatic random copolymers and block copolymers.

In order to promote randomization in copolymerization and to control vinyl content, a modifier may optionally be added to the polymerization ingredients. Amounts range between 0 to 90 or more equivalents per equivalent of lithium. Compounds useful as modifiers are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); tetrahydrofuran (THF), THF oligomers linear and cyclic oligomeric oxolanyl alkanes and the like are found in U.S. Pat. No. 4,429,091, owned by the Assignee of record.

Polymerization is begun by charging a blend of the monomer(s) and solvent to a suitable reaction vessel, followed by the addition of the modifier and the initiator solution previously described. The procedure is carried out under anhydrous, anaerobic conditions. The reactants are heated to a temperature of from about 30° to 120° C. and are agitated for about 0.15 to 24 hours. After polymerization is complete, the product is removed from the heat and terminated with a siloxane end group as is readily known in the art.

The siloxane terminated polymers to be treated in the process of the present invention include any elastomer having a terminal siloxane end group in which the siloxane end group contains one or more hydrolyzable pendant substituents.

Exemplary siloxane terminated polymers are represented by the following structural formula:

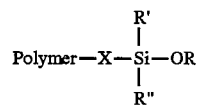

wherein X represents a linking agent or a linking molecule, R is a $C_1$ to $C_{18}$ alkyl, $C_4$ to $C_8$ cycloalkyl, or $C_6$ to $C_{18}$ aromatic group optionally substituted with halo, alkyl, cycloalkyl, or aromatic groups or other groups that are non-reactive with carboxylic acids or acyl halides, and R' and R" are independently selected from the group of: OR, or $C_1$ to $C_{18}$ alkyl, cycloalkyl, or aromatic groups optionally substituted with halo, alkyl, cycloalkyl, or aromatic groups or other organo or non-organo substituent groups such as 2-glycidyloxyethyl, 3-glycidyloxypropyl, and 2-(3,4-epoxycyclohexyl)ethyl that are non-reactive under reaction conditions with carboxylic acid groups or acyl halides that are known in the art as substitutable on silicon atoms. Suitable substituents contain no active hydrogen atoms.

Quenching is usually conducted by contacting the siloxane terminated polymer with a quenching agent for about 0.05 to about 2 hours at temperatures of from about 30° to 120° C. to insure complete reaction. Suitable quenching agents include alcohols such as isopropyl alcohol and the like.

Typically the siloxane terminated polymer would now undergo desolventization by contacting the polymer with either steam or water heated to a temperature above the boiling point of the solvent in which the polymerization was conducted. For instance the boiling point of n-hexane is 69° C., thus desolventization would preferably be conducted with water heated to preferably at least 80° C.

According to the process of the present invention, prior to desolventization the polymer is treated with a viscosity stabilizing agent soluble in the solvent used to prepare the polymer, preferably hydrocarbon soluble. Suitable viscosity stabilizing agents include but are not limited to: methane sulfonic acid, toluene sulfonic acid, sulfuryl chloride, thionylchloride, phosgene, carbon dioxide, sulfur dioxide, sulfur trioxide, $SOCl_2$ and $SO_2Cl_2$; or a carboxylic acid or an acyl halide represented by the formula: $R_1(COX)_b$ wherein $R_1$ is H, a $C_1$–$C_{18}$ aliphatic hydrocarbon, $C_6$–$C_{18}$ cycloaliphatic hydrocarbon, or $C_6$–$C_{18}$ aromatic hydrocarbon; X is OH, Cl, Br, I or F; and b is 1, 2, 3 or 4. Acids useful in the present invention include aliphatic, cycloaliphatic and aromatic monocarboxylic, dicarboxylic, tricarboxylic and tetracarboxylic acids. Preferable carboxylic acids for use in the present invention include but are not limited to acetic acid, propionic acid, butyric acid, hexanoic acid, 2-methylhexanoic acid, cyclohexanoic acid and benzoic acid and preferable acyl halides include acetylchloride and benzoylchloride. Dicarboxylic acids and other polyfunctional acids such as phthalic acid, terephthalic acid, glutsric acid and succinic acid and the like am useful as viscosity stabilizing agents only if they are sufficiently soluble in the reaction system and the inert solvent used during the polymerization of the siloxane terminated polymers to be stabilized.

The preferred stabilizing agents useful in the present invention include $C_1-C_{12}$ aliphatic and $C_6-C_{12}$ cycloaliphatic and aromatic carboxylic acids including acetic acid, propionic acid, butyric acid, decanoic acid, cyclohexanoic acid, benzoic acid and the like, as well as corresponding acyl halides.

The polymer is treated with a viscosity stabilizing agent in a viscosity stabilizing amount ranging from 0.8 to 1.2 mole equivalents of viscosity stabilizing agent for each mole equivalent of anionic initiator, preferably lithium, used in the polymerization of the polymer and present in the polymer, most preferably with a viscosity stabilizing amount ranging from 0.9 to 1.0 equivalents of viscosity stabilizing agent for each mole equivalent of anionic initiator.

The viscosity stabilizing agents of the present invention do not react with the siloxane terminal end groups of the polymer but instead serve to neutralize the by-product lithium compounds in admixture with the polymer. The use of acyl halides as viscosity stabilizing agents in the present invention stabilizes the Mooney viscosity of the polymer during desolventization and further serves to prevent the formation of low boiling alcohols during desolventization thereby reducing the difficulties in recycling essentially pure solvent to further polymerization processes. While employing the weight stabilizing agents of the present invention solvent is removed from the polymer by using conventional steam or water desolventization techniques and the resultant recovered polymer displays minimal or no increase in Mooney viscosity in comparison to before and after solvent removal. The process of the present invention has been described as being useful in stabilizing the Mooney viscosity of a siloxane terminated polymer having at least one hydrolyzable substituent on the siloxane end group against substantial increases during contact with water, preferably during desolventization, by treating the siloxane terminated polymer with a stabilizing amount of an acid or an acyl halide prior to desolventization by contact with water in the form of either steam or water heated to a temperature above the boiling point of the solvent to be separated from the polymer. It must also be understood that the stabilizing agents of the present invention serve to stabilize the Mooney viscosity of a siloxane terminated polymer having at least one hydrolyzable substituent on the siloxane end group against substantial increases during contact with water not only during desolventization but also during subsequent storage. Polymers can come into contact with water in the form of moisture in the air or in some other manner. A substantial increase in Mooney viscosity would be any increase in ML4 at 100° C. of over thirty percent. Furthermore, when acylhalides are used as viscosity stabilizers in the process of the present invention their use not only prevents a further rise in polymer-coupling and Mooney viscosity growth after desolventization of the polymers, but acylhalides also form less volatile products than alcohol by formation of esters thereby simplifying recovered solvent purification.

In the following examples the base styrene-butadiene polymer (SBR) was prepared under anhydrous and anaerobic conditions in a two gallon, jacketed, stainless steel reactor fit with a stirrer.

EXAMPLE A

An "in situ" lithium hexamethyleneimide initiator was prepared in the following manner. A charge of 9.70 mmoles of hexamethyleneimine, 4.31 mmoles of 2,2'-di (tetrahydrofuryl)-propane and 10.78 mmoles n-BuLi was added to the reactor containing 673.6 gms. of 1,3-butadiene, 224.5 gms. of styrene and 4091.4 gms. of hexane resulting in a blend concentration of 18.0% by weight of monomer. The batch was heated to 125° F. and the batch polymerized to a peak exotherm of 192° F. in 17.5 minutes. Two minutes later, the SBR polymer cement containing 25% by weight of styrene was injected anaerobically ("live"), over a period of twelve minutes from the reactor into baked dry, nitrogen-purged 32 oz. bottles sealed with rubber liners under crown caps.

EXAMPLE B

An "in situ" lithium hexamethyleneimide initiator was prepared in the following manner. A charge of 9.70 mmoles of hexamethyleneimine, 4.31 mmoles of 2,2'-di (tetrahydrofuryl)-propane and 10.78 mmoles n-BuLi was added to the reactor containing 583.8 gms. of 1,3-butadiene, 314.3 gms. of styrene and 4091.4 gms. of hexane resulting in a blend concentration of 18.0% by weight of monomer. A charge of 0.07 equivalents of potassium tert-amylate per mole of n-BuLi was used in the polymerization. The batch was heated to 125° F. and the batch polymerized to a peak exotherm of 192° F. in 17.5 minutes. Two minutes later, the SBR polymer cement containing 35% by weight of styrene was injected anaerobically ("live"), over a period of twelve minutes from the reactor into baked dry, nitrogen-purged 32 oz. bottles sealed with rubber liners under crown caps.

In the following examples all Mooney viscosities were measured at 100° C.

EXAMPLES 1 to 3

Acetylchloride Treatment of a GPMOS Terminated 35% Styrene SBR

Live SBR containing 35% by weight of styrene as prepared in Example B in the above identified manner was terminated with 3-glycidoxypropyltrimethoxysilane (GPMOS) by adding a 1.0 molar solution of the silane at a ratio of 0.9 mmoles Si/mmole total Li used in the polymerization and hand-mix vigorously for approximately 30 seconds. A first bottle (Example 1) containing 48.2 grams of the GPMOS-terminated sample and a second bottle (Example 2) containing 52.9 grams of the GPMOS-terminated sample were tumbled at 25° C. for 45 minutes, however, no acetyl chloride was added. A third bottle (Example 3) containing 47.3 grams of the GPMOS-terminated sample polymer was treated with an amount of acetyl chloride equal to the total anionic initiator (base) present in the sample, then tumbled at 25° C. for 45 minutes. All samples were finally treated with 0.5 mls isopropanol (neat) followed by 3.0 mls of 0.114 g. butyl hydroxylated toluene(BHT)/ml hexane solution. The untreated polymer in Example 1 was drum dried. The treated and untreated polymer samples of Examples 2 and 3 were recovered by steam desolventization involving stripping off the polymer solvent using a vigorously stirred, distilled water bath heated with live steam to 90° C. The products were air-dried at 80° C. and vacuum-dried remove occluded water. The reaction parameters and the Mooney viscosity of each of the recovered polymer samples is displayed in Table 1.

TABLE 1

| Example No. | 1 | 2 | 3 |
| --- | --- | --- | --- |
| Weight polymer, g | 48.2 | 52.9 | 47.3 |
| AcetylCl/Li + K) | 0 | 0 | 1.0 |
| Solvent removal | Drum Drying | Steam | Steam |
| $ML_4$ @ 100° C. | 32.7 | 48.5 | 23.8 |

EXAMPLES 4 to 6

Acetylchloride Treatment of a MTPOS Terminated 35% Styrene SBR

Live SBR containing 35% by weight of styrene as prepared in Example B in the above identified manner was terminated with methyltriphenoxy-silane (MTPOS) by adding a 1.0 molar solution of the silane at a ratio of 0.9 mmoles Si/mmole total Li used in the polymerization and hand-mix vigorously for approximately 30 seconds. In Example 4, a MTPOS-terminated sample, containing 50.4 grams (first bottle) of polymer was treated with an amount of acetyl chloride equal to the total anionic initiator(base) present in the sample, then tumbled at 25° C. for 45 minutes and was finally treated with 0.5 mls isopropanol (neat) followed by 3.0 mls of 0.114 g. BHT/ml hexane solution. In Example 5, a second bottle containing 47.2 grams of the MTPOS-terminated sample was treated in an identical manner with the exception that no acetyl chloride was added. Each of these treated and untreated samples were recovered by steam desolventization involving stripping off the polymer solvent using a vigorously stirred, distilled water bath heated with live steam to 90° C. The product is air-dried at 80° C. and vacuum-dried to remove occluded water. In Example 6, a third bottle containing 44.6 grams of the MTPOS-terminated sample was treated in an identical manner with the exception that no acetyl chloride was added and the polymer was recovered by drum drying. The reaction parameters and the Mooney viscosity of each of the recovered polymer samples is displayed in Table 2.

TABLE 2

| Example No. | 4 | 5 | 6 |
| --- | --- | --- | --- |
| Weight of polymer, g | 50.4 | 47.2 | 44.6 |
| AcetylCl/Li + K) | 0.935 | 0 | 0 |
| Solvent removal | Steam | Steam | Drum Drying |
| $ML_4$ @ 100° C. | 19.3 | 45.8 | 25.3 |

EXAMPLE 7 to 9

Samples of a live cement as produced in Example A was terminated with methyltrimethoxysilane (MTMOS) according to the procedure of Example 1 above except that 0.8 mmoles Si/mmole total Li and a termination reaction time of 1.5 hrs. at 50° C. were used. Also, benzoyl chloride is used as in place of the acetyl chloride with a reaction, for 35 min. at 50° C. being used for neutralization. A first bottle containing a MTMOS-terminated sample, containing 59.8 grams (Example 7) of polymer respectively, was treated with an amount of benzoyl chloride equal to the total anionic initiator(base) present in the sample, then tumbled at 25° C. for 45 minutes and was finally treated with 0.5 mls isopropanol (neat) followed by 3.0 mls of 0.114 g. BHT/ml hexane solution. A second 1 bottle containing 59.3 grams of the MTMOS-terminated sample (Example 8) was treated in an identical manner with the exception that no benzoyl chloride was added. Each of these treated and untreated samples were recovered by steam desolventization involving stripping off the polymer solvent using a vigorously stirred, distilled water bath heated with live steam to 90° C. The products were air-dried at 80° C. and vacuum-dried to remove occluded water. In Example 9, a third bottle containing 44.6 grams of the MTPOS-terminated sample was treated in an identical manner with the exception that no benzoyl chloride was added and the polymer was recovered by drum drying. The reaction parameters and the Mooney viscosity of each of the recovered polymer samples is displayed in Table 3.

TABLE 3

| Example No. | 7 | 8 | 9 |
| --- | --- | --- | --- |
| Weight of polymer, g | 59.8 | 59.3 | 61.9 |
| BenzoylCl/Li | 1.0 | 0 | 0 |
| Solvent removal | Steam | Steam | Drum Drying |
| $ML_4$ @ 100° C. | 21.0 | 49.5 | 38.4 |

EXAMPLES 10 to 14

Using the same procedure as in Examples 7 to 9 except samples of a live cement were terminated with methyltrimethoxysilane (MTMOS), 3-glycidoxypropyltrimethoxysilane (GPMOS), or tetraethoxysilane (TEOS) except that 2-ethyl-hexanoic acid (2-EHA) was used in place of benzoyl chloride. The reaction parameters and the Mooney viscosity of each of the recovered polymer samples is displayed in Table 4. The polymers produced in Examples 10 to 12 show that the stabilization obtained by the treatment with 2-EHA of polymers terminated with methyltrimethoxysilane is very similar to the stabilization obtained in Example 7. The low $ML_4$'s displayed by the 2-EHA treated polymers end capped with either TEOS or GPMOS show that only minor hydrolysis occurred during steam desolventization in Examples 13 and 14.

TABLE 4

| Example No. | 10 | 11 | 12 | 13 | 14 |
| --- | --- | --- | --- | --- | --- |
| Polymer wt., g | 61.9 | 59.3 | 60.3 | 57.3 | 60.1 |
| Silane | MTMOS | MTMOS | MTMOS | TEOS | GPMOS |
| 2-EHA/Li | 0 | 0 | 1.0 | 1.0 | 1.0 |
| Solvent removal | Drum Drying | Steam | Steam | Steam | Steam |
| $ML_4$ @ 100° C. | 38.4 | 49.5 | 21.6 | 23.6 | 27.3 |

EXAMPLE 15 to 18

In the following examples base styrene-butadiene polymers (SBR) were prepared under anhydrous and anaerobic conditions in a 10 or 20 gallon, jacketed, stainless steel reactor fit with a stirrer. An "in situ" lithium hexamethyleneimide initiator was prepared in the following manner. Charges of hexamethyleneimine (HMI), 2,2'-di-(tetrahydrofuryl)-propane (OOPS) and n-BuLi were added to the reactor containing 1,3-butadiene, styrene and hexane resulting in a blend concentration of 18.0% by weight of monomer. The batch was heated to 110 ° F. and five minutes after the peak exothermic temperature was reached the polymer was sampled for Mooney viscosity. The live SBR cement in the reactor was terminated with 3-glycidoxypropyl-trimethoxy-silane (GPMOS) by adding a 1.0 molar solution of the silane at a ratio of 0.9 mmoles Si/mmole total Li used in the polymerization and mixed for approximately 15 to 20 minutes. The SBR polymer cement was transferred from the reactor into a second dry, nitrogen-purged reactor. As displayed in Table 4, samples of GPMOS-terminated SBR polymer samples in Examples 15 and 16 were treated only with 100 cc of water and 54 g. of an anti-oxidant (BHT) for purposes of comparison and two SBR polymer samples in Examples 17 and 18 were treated according to the process of the present invention and were stabilized with 2-ethyl hexanoic acid (2-EHA) and desolventized by contacting the polymer and solvent with water heated to 80° C. via steam desolventization (SD) or drum drying (DD). The Mooney viscosity of each of the recovered polymer samples is displayed in Table 5.

TABLE 5

| Example No. | 15 | 16 | 17 | 18 |
|---|---|---|---|---|
| Reactor gallons | 20 | 20 | 10 | 10 |
| # of Hexane | 29.8 | 29.5 | 24.6 | 24.6 |
| # of Styrene | 27 | 23.4 | 19.5 | 22.5 |
| # of Butadiene | 9.7 | 13.6 | 11.3 | 8.1 |
| % monomers | 18 | 18 | 18 | 18 |
| 0.3M BuLi, cc | 168 | 181 | 163 | 151 |
| HMI, cc | 4.5 | 4.9 | 4.4 | 4.1 |
| OOPS, cc | 5.3 | 0.66 | 0.6 | 4.7 |
| 1.6M KO-t-Amylate, cc | 0 | 2 | 1.8 | 0 |
| 4.53M GPMOS, cc | 7.7 | 8.4 | 7.6 | 7 |
| 2-EHA, cc | 0 | 0 | 8 | 6.3 |
| $ML_4$ @ 100° C., DD | 61.5 | 60.5 | 49.7 | 49 |
| $ML_4$ @ 100° C., SD | 76 | 122 | 48 | 54 |
| % Styrene | 25.3 | 35.7 | 34.9 | 25.8 |
| % Vinyl in P.D.. | 55 | 24.5 | 23.6 | 51.4 |
| $T_g$, C.° | −33.8 | −52.8 | −49.8 | −34 |
| $M_n \times 10^{-3}$, DD | 201 | 142 | 147 | 158 |
| $M_w/M_n$, DD | 1.32 | 1.49 | 1.58 | 1.41 |
| $M_n \times 10^{-3}$, SD | — | — | 145 | 161 |
| $M_w/M_n$, SD | — | — | 1.57 | 1.39 |

An examination of the polymer characteristics in the above examples supports the objectives of this invention for preventing a further rise in polymer-coupling and Mooney viscosity growth after desolventization of the polymers. The acylhalides achieved the objectives of this invention and form less volatile products than alcohol by formation of esters thereby simplifying recovered solvent purification.

We claim:

1. A process of stabilizing the Mooney viscosity of a siloxane terminated polymer having at least one hydrolyzable substituent on the siloxane end group by treating the siloxane terminated polymer in the presence of an inert solvent with a stabilizing amount of a viscosity stabilizing agent selected from the group consisting of: an acid, an acyl halide, methane sulfonic acid, toluene sulfonic acid, sulfuryl chloride, thionylchloride, phosgene, carbon dioxide, sulfur dioxide, sulfur trioxide, $SOCl_2$ and $SO_2Cl_2$, prior to contacting the siloxane terminated polymer with water.

2. The process of claim 1 wherein the acid or an acyl halide is represented by the formula: $R_1(COX)_b$ wherein $R_1$ is H, a $C_1$–$C_{18}$ aliphatic hydrocarbon, $C_6$–$C_{18}$ cycloaliphatic hydrocarbon, or $C_6$–$C_{18}$ aromatic hydrocarbon; X is OH, Cl, Br, I or F; and b is 1, 2, 3 or 4.

3. The process of claim 1 wherein the acid is selected from the group consisting of: acetic acid, propionic acid, butyric acid, hexanoic acid, 2-ethylhexanoic acid, cyclohexanoic acid and benzoic acid.

4. The process of claim 1 wherein the stabilizing amount of the viscosity stabilizing agent is an amount ranging from 0.8 to 1.2 mole equivalents of the viscosity stabilizing agent for each mole equivalent of anionic initiator used in the polymerization of the siloxane terminated polymer.

5. The process of claim 1 wherein the stabilizing amount of the viscosity stabilizing agent is an amount ranging from 0.9 to 1.1 mole equivalents of the viscosity stabilizing agent for each mole equivalent of anionic initiator used in the polymerization of the siloxane terminated polymer.

6. The process of claim 1 wherein the step of contacting the siloxane terminated polymer with water comprises a process of removing a solvent from the siloxane terminated polymer by desolventization utilizing heated water or steam.

7. The process of claim 1 wherein the step of contacting the siloxane terminated polymer with water comprises contacting the siloxane terminated polymer with moisture during storage.

8. The process of claim 1 wherein the viscosity stabilizing agent is substantially soluble in the solvent used in the polymerization of the siloxane terminated polymer.

* * * * *